(12) United States Patent
Ponikiewski et al.

(10) Patent No.: US 11,312,406 B2
(45) Date of Patent: Apr. 26, 2022

(54) STEERING COLUMN ASSEMBLY

(71) Applicants: ZF Steering Systems Poland Sp. Z.o.o., Czechowice-Dziedzice (PL); ZF AUTOMOTIVE GERMANY GMBH, Aldorf (DE)

(72) Inventors: Pawel Ponikiewski, Pewel Mala (PL); Artur Wojtalik, Katowice (PL)

(73) Assignees: ZF Steerino Svstems Poland Sp. Z.o.o., Czechowice-Dziedzice (PL); ZF Automotive Germany GmbH, Aldorf (DE)

( * ) Notice: Subject to any disclaimer, the term of this patent is extended or adjusted under 35 U.S.C. 154(b) by 215 days.

(21) Appl. No.: 16/561,415

(22) Filed: Sep. 5, 2019

(65) Prior Publication Data

US 2020/0164911 A1 May 28, 2020

(30) Foreign Application Priority Data

Nov. 28, 2018 (EP) .................................... 18461638
Feb. 7, 2019 (GB) .................................... 1901728

(51) Int. Cl.
*B62D 1/19* (2006.01)

(52) U.S. Cl.
CPC ............ *B62D 1/192* (2013.01); *B62D 1/195* (2013.01)

(58) Field of Classification Search
CPC .......... B62D 1/192; B62D 1/195; B62D 1/19; F16F 7/12; F16F 7/128; F16F 7/123
See application file for complete search history.

(56) References Cited

U.S. PATENT DOCUMENTS

| | | | | |
|---|---|---|---|---|
| 9,889,875 B2* | 2/2018 | Matsuno | ................ | B62D 1/187 |
| 10,000,229 B2* | 6/2018 | Matsuno | ................ | B62D 1/189 |
| 10,183,689 B2* | 1/2019 | Matsuno | ................ | B62D 1/192 |
| 10,899,379 B2* | 1/2021 | Martinez | ................ | B62D 1/185 |
| 2021/0024121 A1* | 1/2021 | Matsuno | ................ | B62D 1/185 |

FOREIGN PATENT DOCUMENTS

| | | |
|---|---|---|
| GB | 2350328 A | 11/2000 |
| JP | 2004009940 A | 1/2004 |
| JP | 2017081214 A | 5/2017 |

* cited by examiner

*Primary Examiner* — Jonathan Ng
*Assistant Examiner* — Joselynn Y Sliteris
(74) *Attorney, Agent, or Firm* — Robert James Harwood

(57) ABSTRACT

A steering column assembly includes a mounting bracket which is securely fixed to a car cross beam or the like; a support bracket located below the mounting bracket, the two brackets being connected together during normal operation by at least one frangible connector a telescopic shroud having a first portion that surrounds a steering shaft, the first portion being fixed to the support bracket, and an energy absorbing device. The energy absorbing devices further includes: a wire which extends along an underside of the mounting bracket and is secured at opposing ends to respective anchor portions of the mounting bracket, and a fixing part of the support bracket having an opening through which the wire passes, whereby in a crash the frangible connector is broken to permit the support bracket to move relative to the mounting bracket whereupon the wire is pulled through the opening in the fixing part.

8 Claims, 3 Drawing Sheets

STEERING COLUMN ASSEMBLY

CROSS-REFERENCE TO RELATED APPLICATIONS

This application claims priority to European Patent Application No. 18461638.1, filed on Nov. 28, 2019, and United Kingdom Patent Application No. 1901728.4, filed Feb. 17, 2019, the disclosures of which are incorporated herein by reference in its entirety.

TECHNICAL FIELD

The present disclosure relates to improvements in steering column assemblies.

BACKGROUND

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion. In some cases, the shroud will not include two portions and instead the shroud will simply move relative to the bracket.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle or to a mounting bracket fixed to the cross beam.

A lever may be provided on an end of the a clamp bolt that forms a part of the clamp mechanism that the driver can push or pull to rotate the clamp bolt and thereby operate the clamp mechanism.

The clamp mechanism may be adjustable to permit reach adjustment, or rake adjustment, or both, of the steering wheel. In the event of a crash the shroud must be able to move, to permit the steering wheel to move forward if impacted by a driver, and this is achieved if it is able to break free of the clamp mechanism, or for the support bracket to be able to break free of the vehicle body, to allow the steering column assembly to collapse telescopically with the support shroud still secured to the steering column shroud.

When a crash does occur, it is important to provide a mechanism for absorbing the energy so that the steering column collapses in a controlled manner. Numerous prior art designs have been proposed, generally with the support bracket being fixed to a mounting bracket through one or more frangible connectors. Movement of the two brackets relative to each other causes an energy absorbing member to deform which absorbs energy. These members typically are in the form of one or more straps or wires. A plastic deformation may be achieved by dragging the members around anvils or through openings during a collapse.

SUMMARY

An object of the present invention is to ameliorate some of the shortcomings of those prior art collapsible steering column assemblies.

According to a first aspect the invention provides a steering column assembly for a vehicle comprising: a mounting bracket which in use is securely fixed to a car cross beam or similar fixed component; a Support bracket located below the mounting bracket, the two brackets being connected together during normal operation by at least one frangible connector a telescopic shroud having a first portion that surrounds a steering shaft, the first portion being fixed to the support bracket, and an energy absorbing device. The energy absorbing devices further includes: a wire which extends along an underside of the mounting bracket and is secured at opposing ends to respective anchor portions of the mounting bracket, and a fixing part of the support bracket having an opening through which the wire passes, whereby in the event of a crash the frangible connector is broken to permit the support bracket to move relative to the mounting bracket whereupon the wire is deformably pulled through the opening in the fixing part.

Securing the wire along the underside of the mounting bracket to the anchor portions at each end ensures it is protected during installation of the assembly to the vehicle cross beam. The wire may be secured to a first anchor portion located at an uppermost end of a main central body of the mounting bracket which is nearest the wheel and to a second anchor portion located at a lowermost end of the mounting bracket that is furthest from the steering wheel.

The wire may be completely within a region covered by the mounting bracket. This may be in region bounded above by the mounting bracket and below by the shroud. The wire may comprise a metal wire which in use is plastically deformable. Suitable materials include 42CrMo4 but the reader will understand that the choice of material for the wire material will be depend on the requirements of each chosen application in terms of the energy to be absorbed. The wire may additionally be coated with low friction coating by e.g. spraying to help in the drawing of the wire through the fixing part.

In the event of a crash where the one or more frangible connectors are broken the support bracket may be suspended from the mounting bracket by the wire hanging from the fixing part with no other vertical support provided. This arrangement simplifies the design requirement of the mounting bracket, as the vertical location of the shroud is controlled by the wire and the side to side controlled by the optional ribs and guide slots.

Because the wire is below the mounting bracket, the support bracket may hang from the wire, being supported also by the frangible connectors during normal use. The wire may be under tension during normal use of the assembly, i.e. prior to a collapse of the assembly during a crash. By this we mean the wire on both sides of the die is under tension. This helps to increase the stiffness of the mounting bracket if the wire is considered a part of the bracket.

The fixing part of the support bracket may during normal use be located at or close to the end of the wire nearest the wheel. This gives the greatest range of movement as the wire is pulled through the fixing part as the support bracket moves in a crash until the fixing part reaches the opposing end of the wire. The fixing part may be welded or otherwise secured to an upper plate of the support bracket. Preferably the wire extends along a path which is parallel to the long axis of the shroud. This ensures no twisting force is generated on the shroud as it collapses axially. The wire may be located substantially vertically above the central axis of the shroud.

To help control the movement of the shroud during a collapse, the mounting bracket may have one or more, preferably a pair of, elongate ribs that engage complimentary guide slots in the support bracket, the ribs extending parallel to the axis of the shroud. Where there is a pair of ribs they may be spaced equidistant from and opposite sides of the wire. Of course, the guide slots may be provided in the mounting bracket and ribs in the support bracket. The guide slots may comprise grooves formed in the bracket. They may comprise a step change in the plane of the bracket to define a vertical or inclined side wall, the ribs comprising complimentary step change in the other bracket to define an opposing side wall.

The mounting bracket may comprise a central plate and wings that project from respective sides of the plate, the wings including openings through which fastenings in use secure the plate to a cross beam of a vehicle. To provide the required travel of the shroud during collapse, the length of the wire and hence the spacing between the points at which the wire is secured to the mounting bracket should be equal to or greater than the required travel. To give the best protection of the wire, this mounting bracket should also have a length, measured along a path parallel to the axis of the shroud, at least equal to the length of travel in a crash.

The central plate may be continuous with substantially no cutouts or openings apart from those required to enable fasteners to pass through the plate. Having no openings makes the bracket relatively more rigid, which helps control the collapse of the shroud. The anchor portions of the mounting bracket may comprise respective tabs that are folded down at each end of the mounting bracket, each including an opening through which the wire passes or a connector that is secured to the end of the wire. The openings may comprise small holes with a diameter slightly greater than the external diameter of the wire. The wire may be secured to the mounting bracket anchor portions by end portions that have an enlarged cross section that are located on an outer side of a respective tab, the enlarged portion being too large to pull through the opening in the tab.

One end of the wire may be provided with an external thread which is threadedly engaged with a complimentary internal thread of a connector. The connector may be tightened onto the wire thereby to tension the wire between the tabs. In a refinement the wire may have an enlarged head at one end and an external thread on the other, the enlarged head being located outside of one tab and the thread being engaged with a complimentary internal thread formed in an opening in the other tab. The wire may be tensioned by rotating the wire to screw the thread of the wire into the thread of the tab allowing simple adjustment. When tensioned, the wire will increase the overall stiffness of the mounting bracket.

The wire may comprise a first portion of a first diameter which passes through the fixing part and a second portion offset from that first portion of a larger diameter, the second portion being sized such that the second portion of the wire must deform to pass through the fixing part in a crash. As the wire is pulled through the fixing part, it is deformed. The fixing part may be considered to function as a die. Following a crash, the wire will have deformed and may have increased in length as it is in effect extruded through the fixing part. This deformation absorbs crash energy.

BRIEF DESCRIPTION OF THE DRAWINGS

There will now be described, by way of example only, one embodiment of the present invention with reference to and as illustrated in the accompanying drawings of which

DETAILED DESCRIPTION

Figure 1:
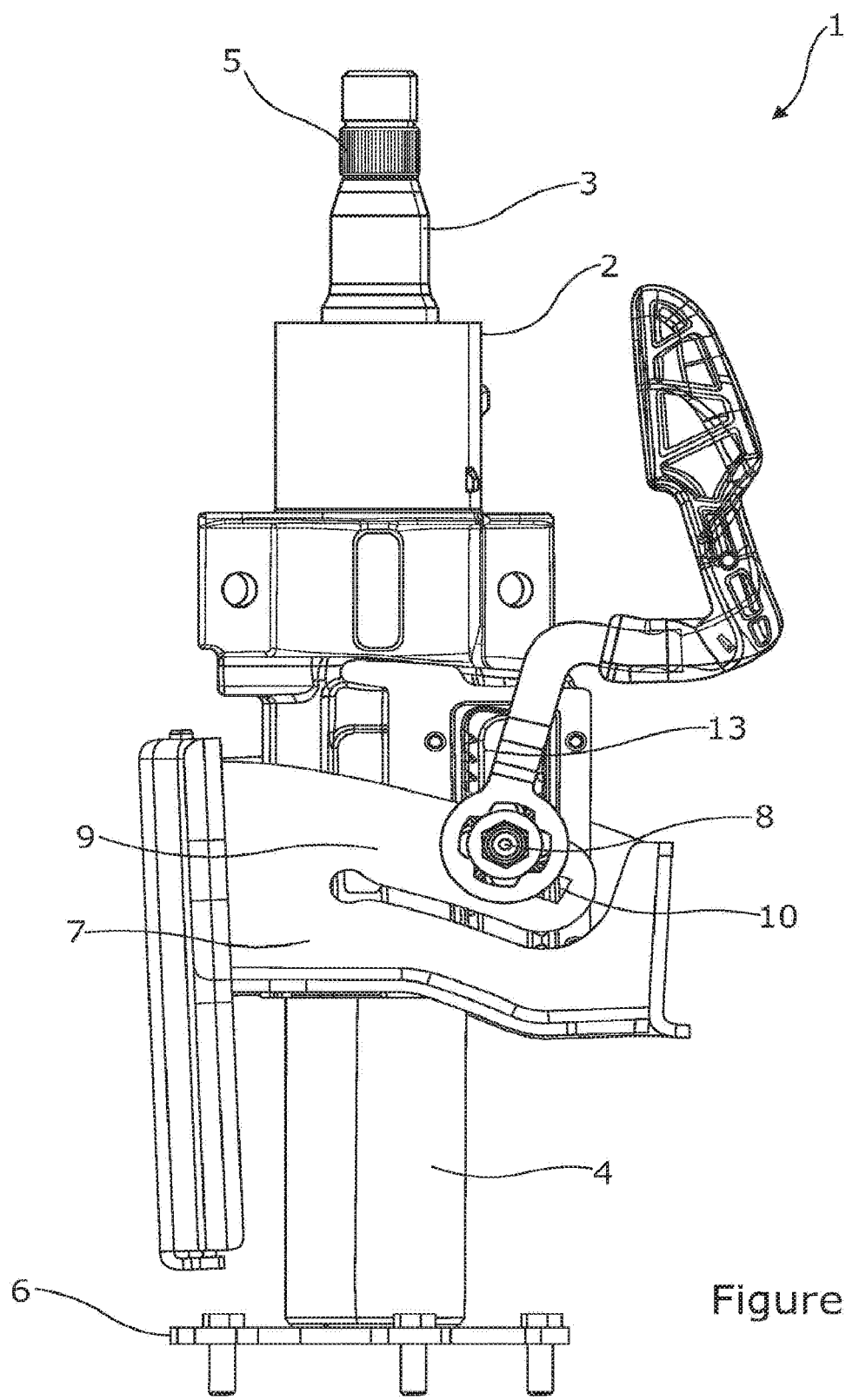
FIG. 1 is a side view of an embodiment of a steering column assembly according to the present invention.
Figure 2:
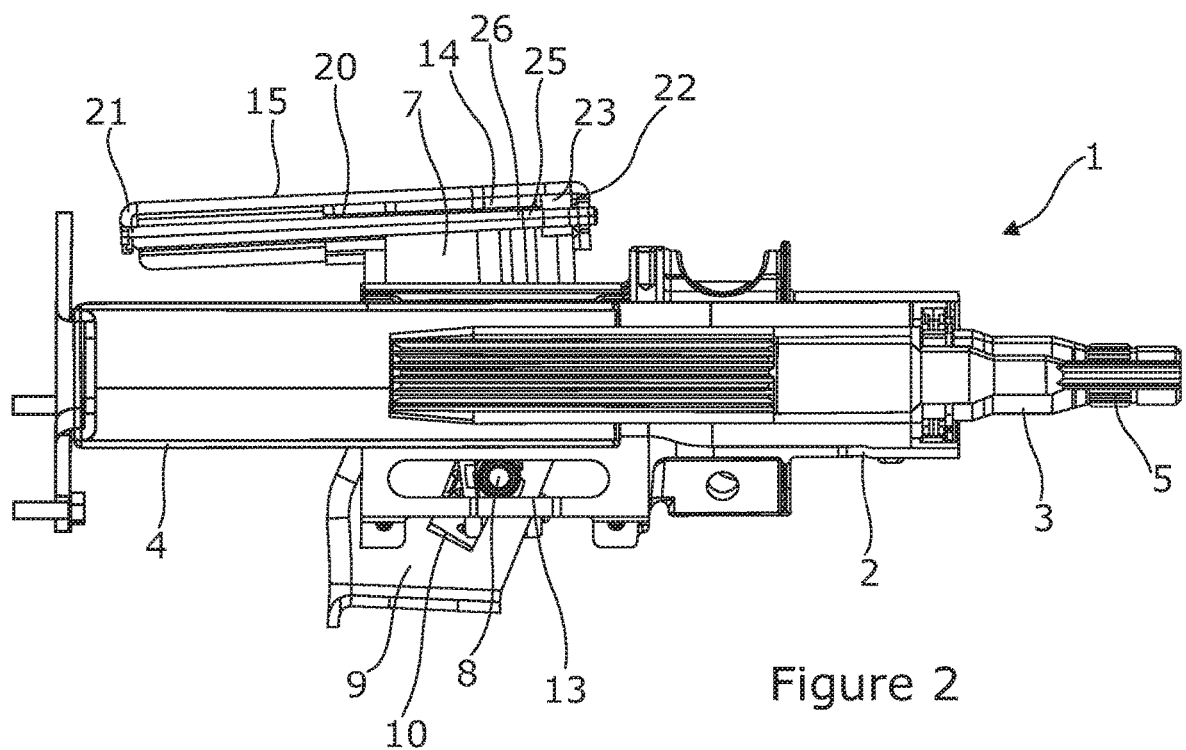
FIG. 2 is a cut away side view of the steering column assembly of FIG. 1 showing the location of the wire, the mounting bracket and the fixing part or die prior to a collapse.
Figure 3:
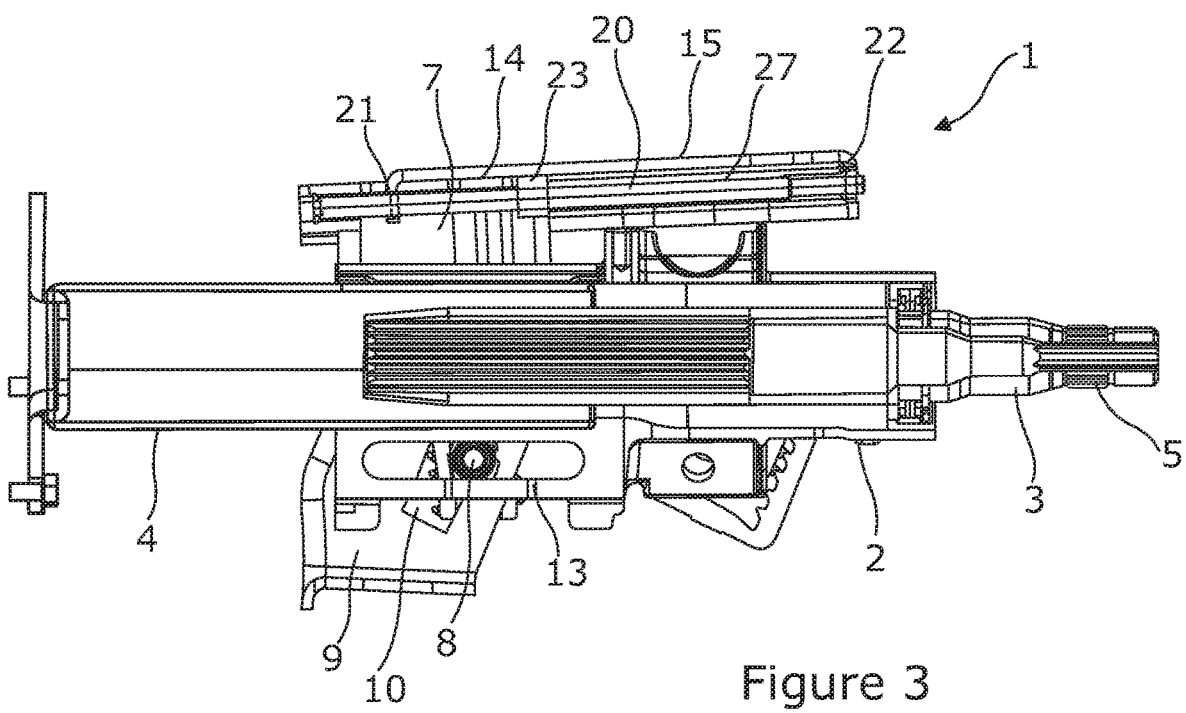
FIG. 3 is a view corresponding to FIG. 2 after a collapse.

As shown in FIGS. 1 to 3, a steering column assembly 1 for a vehicle comprises a two part telescopic shroud having a first tubular portion 2 that surrounds an upper part of a steering shaft 3 and a second tubular portion 4 that surrounds a lower part. The upper part of the steering shaft 3 protrudes from the shroud and is terminated with a splined coupling 5 allowing a steering wheel boss to be fixed to the steering shaft. The opposite end of the shaft 3 may connect to a gearbox (not shown although the gearbox housing 6 is visible). The first shroud portion 2 fits telescopically around an upper end of the second shroud portion 4 allowing the length of the shroud to the adjusted telescopically. This enables the reach of the steering wheel to be adjusted and, as will become apparent, allows for collapse of the steering wheel in the event of a crash where a load such as an unrestrained driver is applied to the steering wheel.

The first portion 2 of the shroud is releasably secured to a support bracket 7 through a clamping mechanism. The clamp mechanism includes a clamp pin 8 which passes through slots in opposed downwardly extending arms of the support bracket that can be seen in FIGS. 4 and 5. One arm 9 and slot 10 can be seen in FIGS. 1 to 3, with the other arm 11 and slot 12 being visible in FIGS. 4 and 5. These arms extend down opposing sides of the first shroud portion 2. When the clamp mechanism is in an unclamped position the clamp pin 8 may move up and down along the slots 10, 12 to permit the rake of the steering to be adjusted. When in the clamped position the clamp pin 8 is secured such that it cannot move along the slots 10, 12. Where optional reach adjustment is required, the pin may extend through substantially horizontal slots in a rail attached to the top of the shroud, again being prevented from sliding along those horizontal slots when the clamp mechanism is in the clamped position. One slot 13 can be seen in FIGS. 1 to 3.

The support bracket 7 has an upper plate 14 that is fixed to a mounting bracket 15. This mounting bracket 15 in use is securely fixed to a car cross beam or similar fixed component using a pair of fixing bolts (not shown) that each pass through a hole 16,17 in a respective side wing 18,19 of the mounting bracket.

During normal use the support bracket 7 should be restrained so that it does not move relative to the mounting bracket 15 and this is achieved using a pair of frangible connectors (not shown) that pass through openings in both the brackets. Such frangible connectors are well known in the art. The mounting bracket 15 has a length L, measured along a line parallel to the axis of the steering shaft that is approximately equal to the required collapse stroke of the steering wheel.

Also connecting the mounting bracket 15 and support bracket 7 together is an energy absorbing device in the form of a wire 20 which extends along an underside of the mounting bracket 15 and is secured at opposing ends to respective anchor portions 21, 22 of the mounting bracket. The anchor portions as shown comprise tabs that are folded down from the uppermost and lowermost ends of the mounting bracket.

The energy absorbing device also comprises a fixing part 23 that defines a die and that is secured to or formed integrally to the support bracket 7. In this example it is welded to the top of the plate of the support bracket 7. The fixing part has an opening through which the wire passes. As shown, the die projects upwards from a top surface of the support bracket 7 and has an opening 24 that allows the die to be threaded onto the wire.

FIG. 2 shows the location of the fixing part 23 when the steering column is in normal use prior to a collapse. The fixing part in this position is slidably located onto a reduced diameter portion 25 of the wire adjacent the uppermost anchor 22, abutting a shoulder 26 in the wire that joins the reduced diameter portion to the remainder of the wire 27 which has a larger diameter. This diameter is greater than the diameter of the hole in the fixing part.

In the event of a crash the frangible connectors are broken to permit the support bracket to move relative to the mounting bracket as the steering wheel moves, shortening the telescopic shroud. This movement forces the fixing part 23 along the wire 20, which is plastically deformed as it is pulled through the opening in the fixing part. At the end of a collapse the fixing part 23 is at the opposite end of the wire 20 from which it started, as shown in FIG. 3.

It can be seen that during a collapse the shroud is suspended from the mounting bracket 15 only by the wire 20. To control the path of collapse, the mounting bracket is provided with two ribs 28, 29, one on either side of the wire, that cooperate with guide surfaces 30, 31 formed in the support bracket. The guide surfaces 30, 31 and ribs 28, 29 can best be seen in FIGS. 4 and 5 which have the shroud removed for clarity.

The ribs 28, 29 and guide surfaces 30, 31 prevent any unwanted side to side movement of the support bracket 7 as it collapses. The wire 20, being under tension, keeps the support bracket snug up against the mounting bracket so they can slide over one another during collapse.

Figure 4:
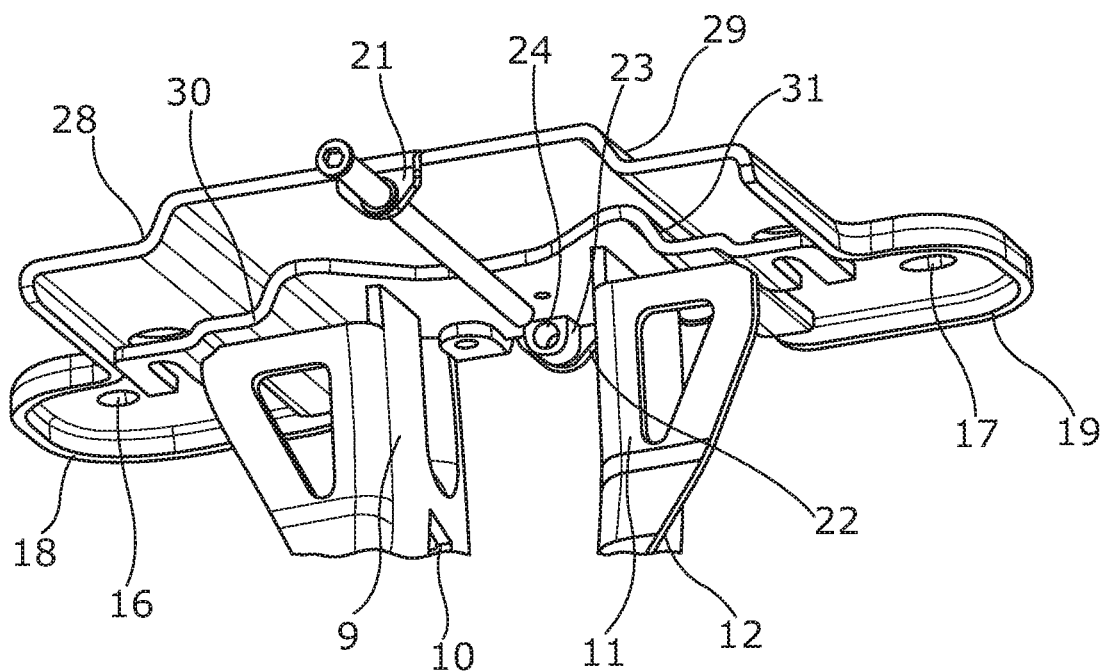
FIG. 4 shows the wire prior to fixing to a terminal portion having been offered up to the terminal portion.
Figure 5:
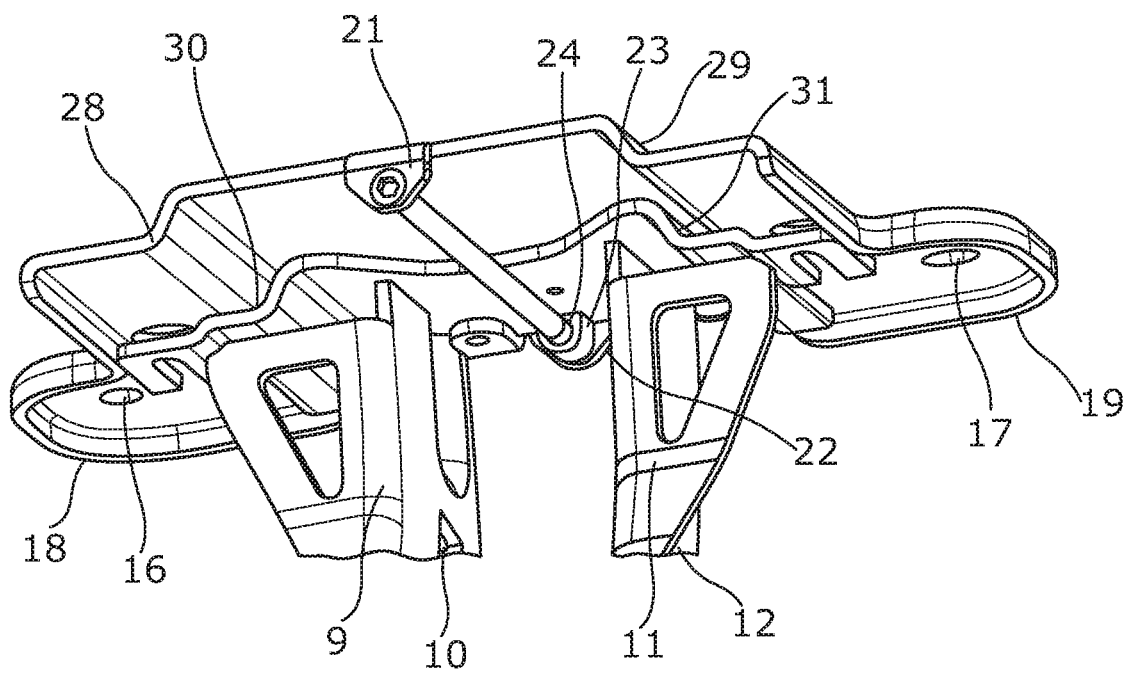
FIG. 5 shows the wire in a fitted position where it is under tension.

FIGS. 4 and 5 show clearly the location of the wire 20. As can be seen it is protected from damage as it is located entirely below the mounting bracket 15. The ends of the wire, where they engage the tabs, are placed under tension. As shown in FIG. 4, the wire has an enlarged head on one end which is provided with a recess shaped to receive a tool such as an Allen key. The other end has an exterior thread. The wire is inserted through one tab, which has an opening larger in diameter than the wire but smaller than the enlarged head. The wire passes through the fixing part or die and is offered up to an opening in the other tab. This opening has a complimentary thread to the wire. The wire is then screwed into that threaded hole until it is under the required tension. This final position is shown in FIG. 5. The tension can be easily adjusted using the Allen key or other suitable fixing tool.

What is claimed is:

1. A steering column assembly for a vehicle comprising:
   a mounting bracket which in use is securely fixed to a car cross beam or similar fixed component;
   a support bracket located below the mounting bracket, the two brackets being connected together during normal operation by at least one frangible connector
   a telescopic shroud having a first portion that surrounds a steering shaft, the first portion being fixed to the support bracket, and
   an energy absorbing device comprising:
   a wire which extends along an underside of the mounting bracket and is secured at opposing ends to respective anchor portions of the mounting bracket, and
   a fixing part of the support bracket having an opening through which the wire passes, whereby in the event of a crash the frangible connector is broken to permit the support bracket to move relative to the mounting bracket whereupon the wire is deformably pulled through the opening in the fixing part.

2. A steering column assembly according to claim 1 in which the wire is secured to a first anchor portion located at an uppermost end of a main central body of the mounting bracket which is nearest a steering wheel and to a second anchor portion located at a lowermost end of the mounting bracket that is furthest from the steering wheel.

3. A steering column assembly according to claim 1 wherein the wire is completely within a region covered by the mounting bracket.

4. A steering column assembly according to claim 1 wherein the wire is under tension during normal use of the steering column assembly.

5. A steering column assembly according to claim 1 wherein the fixing part of the support bracket is during normal use located at or close to an end of the wire nearest a steering wheel.

6. A steering column assembly according to claim 1 wherein the mounting bracket has at least one elongate rib that engages a complimentary guide surface in the support bracket, the at least one rib extending parallel to the axis of the shroud.

7. A steering column assembly according to claim 1 wherein the anchor portions of the mounting bracket comprise respective tabs that are folded down at each end of the mounting bracket, each including an opening through which the wire passes or a connector that is secured to the end of the wire.

8. A steering column assembly according to claim 7 wherein the wire has an enlarged head at one end and an external thread on the other, the enlarged head being located outside of one tab and the thread being engaged with a complimentary internal thread formed in an opening in the other tab.

* * * * *